United States Patent
Takamoto et al.

(10) Patent No.: US 7,934,119 B2
(45) Date of Patent: *Apr. 26, 2011

(54) FAILURE RECOVERY METHOD

(75) Inventors: Yoshifumi Takamoto, Kokubunji (JP); Takao Nakajima, Yokohama (JP); Toshihiko Kashiyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/612,337

(22) Filed: Nov. 4, 2009

(65) Prior Publication Data

US 2010/0050011 A1 Feb. 25, 2010

Related U.S. Application Data

(63) Continuation of application No. 11/339,584, filed on Jan. 26, 2006, now Pat. No. 7,634,681.

(30) Foreign Application Priority Data

Nov. 29, 2005 (JP) .................................. 2005-343046

(51) Int. Cl.
*G06F 11/00* (2006.01)
(52) U.S. Cl. .................................. 714/4; 714/3; 714/15
(58) Field of Classification Search .................. 714/3, 4, 714/15

See application file for complete search history.

(56) References Cited

U.S. PATENT DOCUMENTS

| 5,781,716 | A | 7/1998 | Hemphill et al. |
| 6,609,213 | B1 | 8/2003 | Nguyen et al. |
| 7,383,463 | B2 | 6/2008 | Hayden et al. |
| 2005/0229175 | A1 | 10/2005 | McCrory et al. |

FOREIGN PATENT DOCUMENTS

| JP | 62-172437 | 7/1987 |
| JP | 2001216171 | 8/2001 |
| JP | 2005173751 | 6/2005 |
| JP | 2005-250840 | 9/2005 |

*Primary Examiner* — Michael C Maskulinski
*Assistant Examiner* — Charles Ehne
(74) *Attorney, Agent, or Firm* — Brundidge & Stanger, P.C.

(57) ABSTRACT

The reliability is improved at a low cost even in a virtualized server environment. The number of spare servers is reduced for improving the reliability and for saving a licensing fee for software on the spare servers. A server system comprises a plurality of physical servers on which a plurality of virtual servers run, a single standby server, a module for detecting an active virtual server, and a module for switching the correspondence of boot disks of virtualization modules for controlling virtual servers to the physical servers. When a physical server fails, the boot disk of the associated virtualization module is connected to a spare server to automatically activate on the spare server those virtual servers which have been active upon occurrence of the failure.

11 Claims, 19 Drawing Sheets

FIG. 4

| SERVER VIRTUALIZATION MODULE CONTROL I/F (401) | PROCESSING (402) |
|---|---|
| GENERATE VIRTUAL SERVER | GENERATE NEW VIRTUAL SERVER |
| DELETE VIRTUAL SERVER | DELETE ACTIVE VIRTUAL SERVER |
| ACTIVATE VIRTUAL SERVER | ACTIVATE SPECIFIED VIRTUAL SERVER |
| STOP VIRTUAL SERVER | STOP SPECIFIED VIRTUAL SERVER |
| CAPTURE SNAPSHOT | CAPTURE SNAPSHOT FOR SPECIFIED VIRTUAL SERVER |
| SNAPSHOT ACTIVATION | ACTIVATE SPECIFIED VIRTUAL SERVER FROM SPECIFIED SNAPSHOT |
| SET VLAN | SET VLAN FOR NETWORK OF SPECIFIED VIRTUAL SERVER |
| CHANGE VIRTUAL SERVER SETTING | CHANGE ASSIGNMENT SETTINGS SUCH AS NIC, FAC, etc ASSIGNED TO VIRTUAL SERVER |
| ACQUIRE VIRTUAL SERVER INFORMATION | ACQUIRE INFORMATION ON VIRTUAL SERVER GENERATED BY SERVER VIRTUALIZATION MODULE, AND INFORMATION ON ACTIVE VIRTUAL SERVER |

FIG. 5
SERVER MANAGEMENT TABLE

| 501 | 502 | 503 | 504 | 505 | 506 | 507 | 508 | 509 | 510 |
|---|---|---|---|---|---|---|---|---|---|
| PHYSICAL SERVER IDENTIFIER | BOOT DISK | SERVER IDENTIFIER | SERVER MODE | PROCESSOR /MEMORY | NETWORK IDENTIFIER | NETWORK PORT | DISK | VIRTUALIZATION MODULE IDENTIFIER | SERVER STATE |
| SERVER 1 | LUN0 | WWN1 | SERVER VIRTUALIZATION MODULE | 4GHz×4 2GB | NIC1 NIC2 | #10 #11 | LUN0 LUN10 LUN11 | SERVER VIRTUALIZATION MODULE 1 | ACTIVE SYSTEM |
| SERVER 2 | LUN1 | WWN2 | BASIC | 4GHz×2 4GB | NIC3 NIC4 | #12 #13 | LUN1 LUN10 LUN11 | — | ACTIVE SYSTEM |
| SERVER 3 | LUN3 | WWN3 | SERVER VIRTUALIZATION MODULE | 4GHz×2 2GB | NIC5 | #14 | LUN3 LUN10 LUN11 | SERVER VIRTUALIZATION MODULE 2 | ACTIVE SYSTEM |
| SERVER 4 | — | WWN4 | BASIC | 4GHz×4 4GB | NIC6 NIC7 | #15 #16 | LUN10 | — | STANDBY SYSTEM |

FIG. 6
SERVER VIRTUALIZATION MODULE MANAGEMENT TABLE

| VIRTUALIZATION MODULE IDENTIFIER (601) | CONTROL I/F COMMUNICATION ADDRESS (602) | VIRTUAL SERVER OS IMAGE (603) | STATE (604) | PROCESSOR /MEMORY (605) | NETWORK ASSIGNMENT (606) | NETWORK SETTING (607) | DISK (608) | SNAPSHOT STORAGE LOCATION (609) |
|---|---|---|---|---|---|---|---|---|
| SERVER VIRTUALIZATION MODULE 1 | 192.168.100.1 | /VM1 | ACTIVATED | 1GHz 512MB | VNIC1 NIC1 | VLAN 1 | /DSK/D 1 | /VM/SNAP 1 |
| | | /VM2 | ACTIVATED | 1GHz 512MB | VNIC2 NIC1 | VLAN 1 | /DSK/D 2 | /VM/SNAP 2 |
| | | /VM3 | STOPPED | 1GHz 512MB | VNIC3 NIC2 | VLAN 2 | /DSK/D 3 | /VM/SNAP 3 |
| | | /VM4 | STOPPED | 1GHz 512MB | VNIC4 NIC3 | VLAN 2 | /DSK/D 4 | /VM/SNAP 4 |
| SERVER VIRTUALIZATION MODULE 2 | 192.168.100.2 | /VM5 | STOPPED | 1GHz 512MB | VNIC1 NIC1 | VLAN 3 | /DSK/D 5 | /VM/SNAP 5 |
| | | /VM6 | ACTIVATED | 1GHz 512MB | VNIC2 NIC1 | VLAN 3 | /DSK/D 6 | /VM/SNAP 6 |
| | | /VM7 | STOPPED | 1GHz 512MB | VNIC3 NIC1 | VLAN 3 | /DSK/D 7 | /VM/SNAP 7 |
| | | /VM8 | ACTIVATED | 1GHz 512MB | VNIC4 NIC1 | VLAN 3 | /DSK/D 8 | /VM/SNAP 8 |

FIG. 19

SERVER VIRTUALIZATION MODULE MANAGEMENT TABLE

| VIRTUALIZATION MODULE IDENTIFIER (601) | CONTROL I/F COMMUNICATION ADDRESS (602) | VIRTUAL SERVER OS IMAGE (603) | STATE (604) | PROCESSOR /MEMORY (605) | NETWORK ASSIGNMENT (606) | NETWORK SETTING (607) | DISK (608) | SNAPSHOT STORAGE LOCATION (609) |
|---|---|---|---|---|---|---|---|---|
| SERVER VIRTUALIZATION MODULE 1 | 192.168.100.1 | /VM1 | ACTIVATED | 1GHz 512MB | VNIC1 NIC1 | VLAN 1 | /DSK/D 1 | /VM/SNAP 1 |
| | | /VM2 | ACTIVATED | 1GHz 512MB | VNIC2 NIC1 | VLAN 1 | /DSK/D 2 | /VM/SNAP 2 |
| | | /VM3 | STOPPED | 1GHz 512MB | VNIC3 NIC2 | VLAN 2 | /DSK/D 3 | /VM/SNAP 3 |
| | | /VM4 | STOPPED | 1GHz 512MB | VNIC4 NIC3 | VLAN 2 | /DSK/D 4 | /VM/SNAP 4 |
| SERVER VIRTUALIZATION MODULE 2 | 192.168.100.2 | /VM5 | STOPPED | 1GHz 512MB | VNIC1 NIC1 | VLAN 3 | /DSK/D 5 | /VM/SNAP 5 |
| | | /VM6 | ACTIVATED | 1GHz 512MB | VNIC2 NIC1 | VLAN 3 | /DSK/D 6 | /VM/SNAP 6 |
| | | /VM7 | STOPPED | 1GHz 512MB | VNIC3 NIC1 | VLAN 3 | /DSK/D 7 | /VM/SNAP 7 |
| | | /VM8 | ACTIVATED | 1GHz 512MB | VNIC4 NIC1 | VLAN 3 | /DSK/D 8 | /VM/SNAP 8 |
| SERVER VIRTUALIZATION MODULE 3 | 192.168.100.3 | /VM9 | ACTIVATED | 1GHz 512MB | VNIC1 NIC1 | VLAN 1 | /DSK/D 9 | — |
| | | — | — | — | — | — | — | — |
| | | — | — | — | — | — | — | — |
| | | — | — | — | — | — | — | — |

FAILURE RECOVERY METHOD

CROSS-REFERENCED TO RELATED APPLICATIONS

The present application is a continuation of application Ser. No. 11/339,584, filed Jan. 26, 2006, now U.S. Pat. No. 7,634,681, which claims priority from Japanese application JP 2005-343046 filed on Nov. 29, 2005, the content of which is hereby incorporated by reference into this application.

BACKGROUND OF THE INVENTION

The present invention relates to a failure recovery in a virtual server environment.

In computer systems and data centers of enterprises, an increase in the number of servers owned thereby has resulted in increased operation and management costs. A solution to this problem is a server virtualization technology. The server virtualization technology enables a plurality of virtual servers to operate on a single physical server. The physical server includes resources such as a processor and a memory, which are divided by the server virtualization technology for assignment to different virtual servers such that a plurality of virtual servers are simultaneously executed on the single physical server. The need for the server virtualization technology has increased because of higher performance of processors and lower cost of resources such as memories.

On the other hand, a higher reliability is increasingly required for systems. This is because a larger dependency of an enterprise system on a computer can cause larger damages if the system fails. Generally, a system is improved in reliability by providing an active server and a standby server such that the active server is replaced with the standby server if the former fails.

From the tendency of pursuing two requirements for server virtualization and higher reliability, it seems quite natural to come into request for a high reliability maintained even in a virtualized server environment. However, these two aspects have characteristics which conflict with each other. For example, when a plurality of virtual servers are built on a physical server, a failure in the physical server, if any, would cause all the active virtual servers residing thereon to stop simultaneously. If a system is composed of a plurality of independent servers, a failure in a single physical server will affect in a small range, whereas a failure would affect in a wide range in the virtualization technology which can concentrate a plurality of virtual servers on a single physical server. For this reason, the reliability tends to be lower in virtualized environments. Also, from a viewpoint of reliability, it is contemplated to provide a plurality of virtual servers such that a failed server is replaced with another server. However, this solution requires a number of servers, a licensing fee for software on spare servers, and the like, thus leading to an increased cost.

JP-A-2005-173751 discloses a master system operation management method which provides virtual machines, one of which serves as a master system, and another of which serves as a standby system for the master system, wherein data is synchronized between both the systems to mutually switch the systems on a periodic basis. JP-A-2005-173751 describes that this method can provide a rapid support even for the switching triggered by a failure.

JP-A-2001-216171 discloses a virtual machine system which comprises a plurality of virtual machines that are built under a host operating system (OS) running on a physical machine, wherein one of the virtual machines is kept suspended as a standby system, and in the event of a failure in the active system, a memory image of the virtual machines is transferred to the standby system in order to activate the virtual machine which serves as the standby system in a shorter time.

SUMMARY OF THE INVENTION

It is an object of the present invention to improve the reliability at a low cost even in a virtualized server environment, and more specifically, to reduce the number of spare servers for improving the reliability and reduce a licensing fee for software on the spare servers. Also, for switching from a failed server to a spare server, it is necessary to correctly keep track of virtual servers which have operated. Unlike a physical server, virtual servers can be relatively readily increased or decreased if a physical server has surplus resources such as a processor, a memory and the like. In other words, since the virtual servers can be more frequently changed in configuration than the physical server, a failed server cannot be correctly taken over to a spare server unless active virtual servers are correctly monitored.

A server system comprises a plurality of physical servers on which a plurality of virtual servers run, a single standby server, a module for detecting an active virtual server, and a module for switching the correspondence of boot disks of virtualization modules for controlling virtual servers to the physical servers. When a physical server fails, a the boot disk of the associated virtualization module is connected to a spare server to automatically activate on the spare server those virtual servers which have been active upon occurrence of the failure.

The present invention can advantageously reduce the number of spare servers for improving the reliability and save a licensing fee for software on the spare servers.

Other objects, features and advantages of the invention will become apparent from the following description of the embodiments of the invention taken in conjunction with the accompanying drawings.

BRIEF DESCRIPTION OF THE DRAWINGS

FIG. 4 is a table showing a control interface of the server virtualization module;

FIG. 5 shows the structure of a server management table;

FIG. 6 shows the structure of a server virtualization module management table;

FIG. 19 shows a server virtualization module management table in the third embodiment.

DETAILED DESCRIPTION OF THE EMBODIMENTS

The present invention provides a failure recovery method which takes over a disk used by a failed server to a spare system, and automatically recovers a plurality of virtual servers which had been active on the server when it failed.

1. First Embodiment

Figure 1:
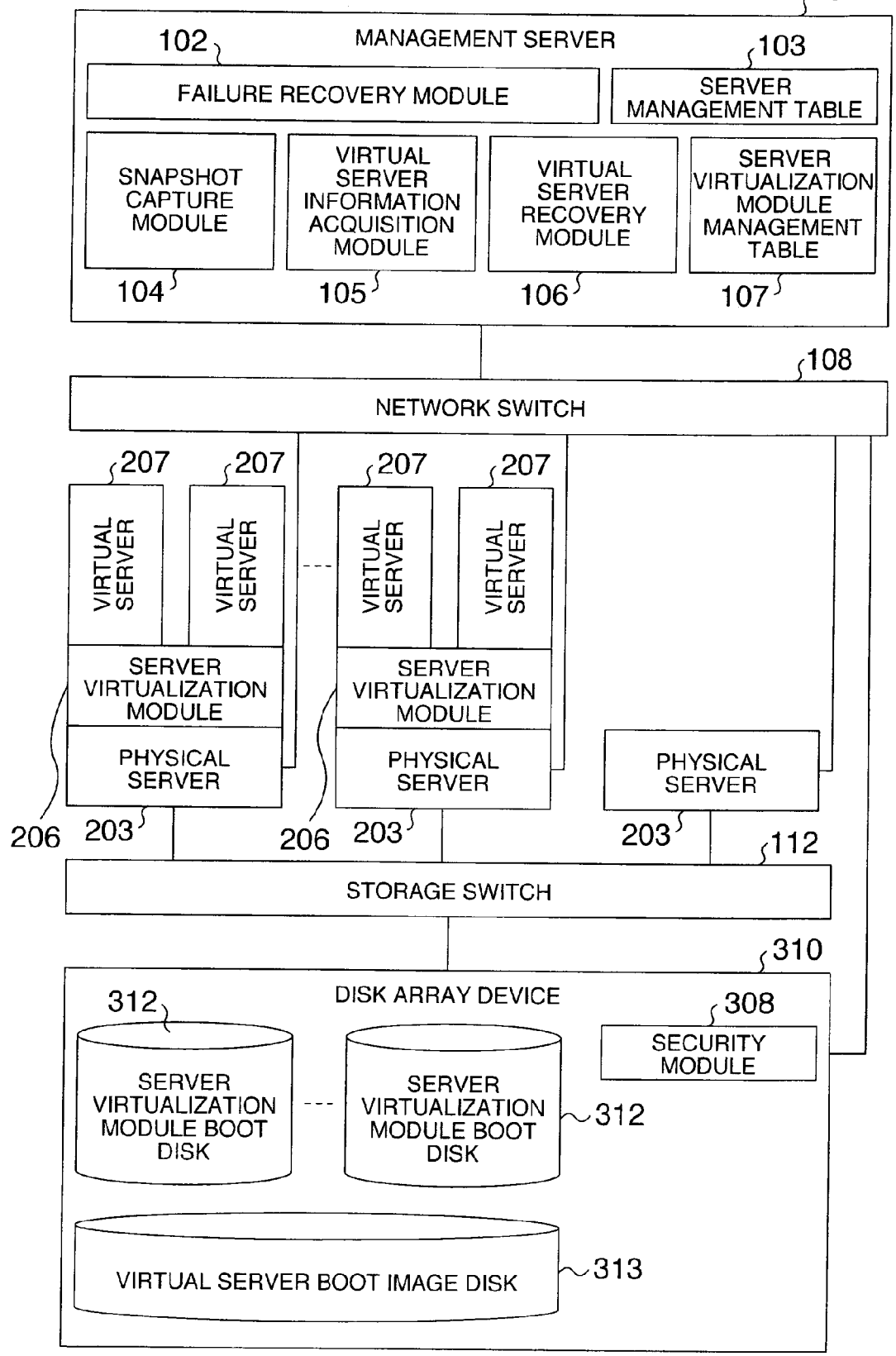
FIG. 1 is a block diagram generally illustrating the configuration of a first embodiment of the present invention.

FIG. 1 generally illustrates a virtual server environment which embodies a failure recovery method according to a first embodiment in the present invention. Control operations characteristic of this embodiment are conducted mainly by a management server 101. The management server 101 comprises a failure recovery module 102, a snapshot capture module 104, a virtual server information acquisition module 105, a virtual server recovery module 106, a server management table 103, and a server virtualization module management table 107. The management server 101 manages a network switch 108, a plurality of physical servers 203, a disk array device 310, and a server virtualization module 206 provided in each physical server. Here, the server virtualization module 206 has a function of making the physical server 203 look like a plurality of virtual servers. In other words, a plurality of virtual servers can be integrated into the single physical server 203. The disk array device 310 is connected to the physical servers 203 through a storage switch 112. The disk array device 310 includes, in addition to a security module 308, a server virtualization module boot disk 312 which stores programs executed by the physical servers 203, and a virtual server boot image disk 313 which stores programs executed by the virtual servers 207. A server virtualization module 110 of each physical server is activated by the server virtualization module boot disk 312 associated with that physical server. Subsequently, the virtual servers 207 are activated from the virtual server boot image disk 115. In the first embodiment of the present invention, when any of the physical servers 203 fails, virtual servers which have been active on the failed physical server are automatically switched to a standby physical server.

Figure 2:
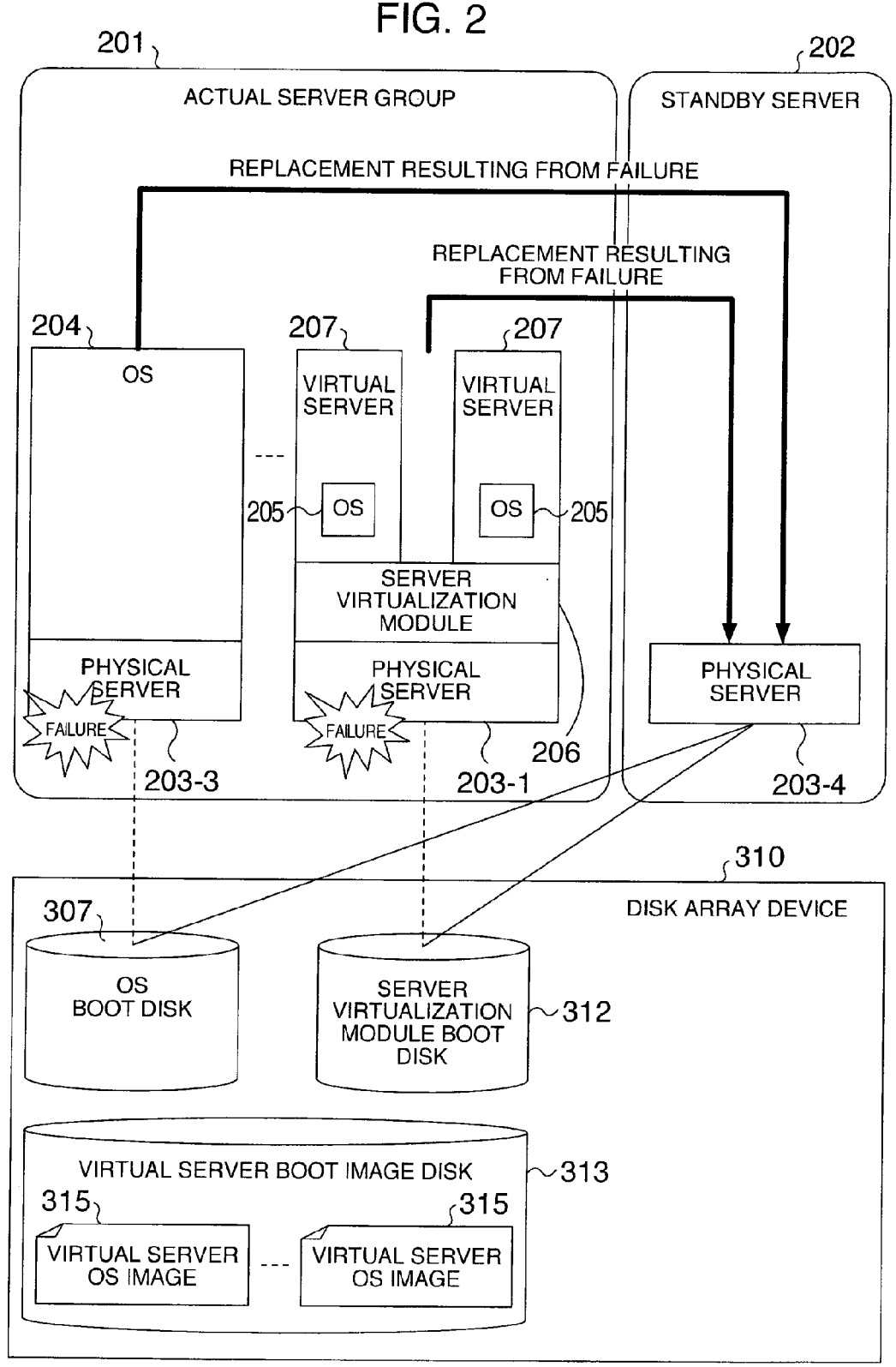
FIG. 2 is a block diagram generally illustrating the operation of the first embodiment.

FIG. 2 illustrates operations performed in the virtual server environment according to the failure recovery method of the first embodiment in the present invention. The physical servers 203 have been previously divided into an active server group 201 which comprises a plurality of physical servers, and a standby server 202. When a failure occurs on a physical server 203-1 of the active server group 201 on which the server virtualization module 206 is active, the server virtualization module boot disk 312 which has been used by the failed physical server 203-1 is assigned to a physical server 203-4 in the standby system, and activated again in the standby system. Further, for virtual servers 207 which have been produced by the server virtualization module 206 before the occurrence of the failure, OS's (operating systems) 205 of the virtual servers are also activated in association using a virtual server OS image 315 saved in the virtual server boot image disk 313, so that the virtual servers can be recovered without human intervention. Since the boot disk and data involved in the switching of servers have to be referenced and updated even after they are taken over to a different physical server, they are preferably stored in the disk array device 310 which can be shared by any of the physical servers. On the other hand, when a failure occurs in the physical server 203-2 on which the OS (operating system) is directly running without the sever virtualization module, the OS boot disk 307 is re-assigned to the physical server 203-4 in the standby system, and is activated again in the standby physical system 203-4. In this situation, since no virtual server is active, no control is conducted for virtual servers. A sequence of these operations is automatically performed by the management server 101 in FIG. 1.

Figure 3:
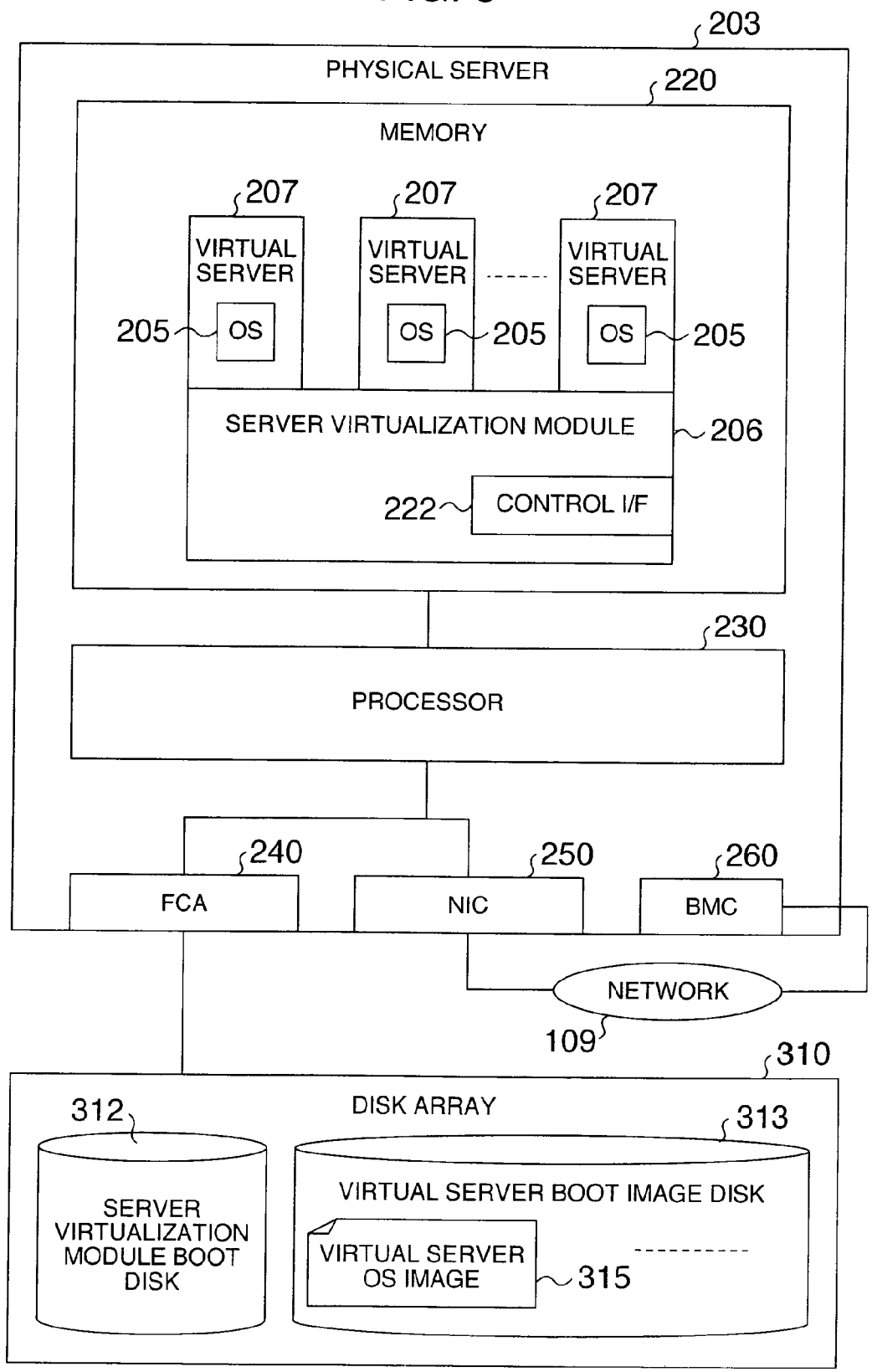
FIG. 3 is a block diagram illustrating the configuration of a server virtualization module.

FIG. 3 illustrates in detail the configuration of the physical server 203 on which the server virtualization module 206 is active. The physical server 203 comprises a memory 220, a processor 230, an FCA (Fibre Channel Adapter) 240, an NIC (Network Interface Card) 250, and a BMC (Baseboard Management Controller) 260. The processor 230 executes a variety of programs stored in the memory 220. The FCA 240 is connected to the disk array device 310. The NIC 250 and BMC 260 are connected to a network 109. The NIC 250 is mainly used for communication with a variety of programs on the memory 220. The BMC 310 is used to detect a failure on a physical server and the like and communicate with other servers through the network switch 108. In this embodiment, NIC 250 and BMC 260 are connected to the same network, but they may be connected to different networks. Also, while FIG. 3 shows one each of the FCA 240 and NIC 250, the physical server 203 may include a plurality of FCA's 240 and NIC's 250. A plurality of virtual servers 207 can be built by operating the server virtualization module 206 which resides on the memory 220. The virtual servers 207 can operate the OS (Operating System) 205 independently of one another. The server virtualization module 206 is read from the server virtualization module boot disk 312 upon activating the physical server 203, and loaded on the memory 220. As the server virtualization module 206 is executed by the processor 230, the virtual servers 207 can be built. The virtual servers 207 are built by reading a predetermined virtual server OS image 315 within the previously set virtual server boot image disk 313. By individually providing the virtual server OS image 315 for each virtual server, completely different OS's and applications can be operated on the single physical server 203. A control I/F (interface) 222 is an interface for controlling the server virtualization module 206 from the outside through the network 109. The creation, deletion and the like of virtual servers 207 can be carried out from the outside through the control I/F 222.

FIG. 4 shows representative operational items associated with the control I/F 222. A column 401 shows the name of each operational item associated with the control I/F 222 of the server virtualization module 206, and a column 402 shows the outline of processing in the respective operational items. "Generate Virtual Server" can cause an associated server virtualization module to generate a new virtual server. "Delete Virtual Server" can delete a virtual server from the associated server virtualization module. "Activate Virtual Server" can activate a specified virtual server on an associated server virtualization module. "Stop Virtual Server" can stop an active virtual server on the associated server virtualization module. Here, the activation and stop of a virtual server correspond to powering ON/OFF in a physical server. "Capture Snapshot" can capture a snapshot of active virtual servers on the associated server virtualization module. The "snapshot" refers to a process of saving the state of active virtual servers in a disk, wherein the OS, applications and the like, running on virtual servers, are saved as they are running. It is therefore possible to immediately activate the virtual servers by activating the virtual servers from the snapshot without activating the OS or applications. "Snapshot Activation" is an interface for immediately activating virtual servers using a specified snapshot on the associated server virtualization module. "Set VLAN" sets a VLAN (Virtual LAN) which is a network of specified virtual servers on the associated server virtualization module. This is used for purposes of keeping the security among virtual servers in an environment in which a plurality of virtual servers are built. For example, when a virtual server 1 and a virtual server 2 are included in different VLAN's, they can be prevented from communicating with each other in a network. "Change Virtual Server Setting" is a control interface item for changing settings of a specified virtual server on the associated server virtualization module. While a plurality of virtual servers can be built by dividing a memory, a network, and a disk of a physical server for assignment thereto, "Change Virtual Server Setting" is used when the assignment is changed after the generation of virtual servers. For example, "Change Virtual Server Setting" may change the boot disk for a virtual server, add a network, and the like. "Acquire Virtual Server Information" can acquire information related to virtual servers generated by a server virtualization module, and information on active virtual servers and the like.

FIG. 5 shows the server management table 103 in detail. The server management table 103 stores detailed information relating to physical servers. A column 501 stores a physical server identifier for identifying a particular physical server. A column 502 stores a location (logical unit number) at which the boot disk is stored in the physical server. A column 503 stores a unique identifier given to the FCA 240 connected to the disk array device. A column 504 stores a server mode indicative of the operating state of the physical server. The column 504 allows an operator to know whether or not the server virtualization module is active on the physical server. A column 505 stores information on the processor and memory capacity of the physical server. A column 506 stores a network identifier for identifying the NIC contained in the physical server. When a plurality of NIC's are contained in a single physical server, the column 506 stores a plurality of network identifiers. A column 507 stores a port number of a network switch to which the NIC is connected. This is used for setting the VLAN of the network switch in keeping the network security of the physical server. A column 508 stores a logical unit number of a disk assigned to the physical server. In the shown example, the LUN (Logical Unit Number) 10 is written in a plurality of physical servers, indicating that the LUN 10 is shared by a plurality of physical servers. A column 509 stores a virtualization module identifier for identifying a server virtualization module when it is active on the physical server. The virtualization module identifier 509 is related to a server virtualization module management table, later described. A column 510 indicates the state and role of the physical server, and stores, in the shown example, information indicative of whether the physical server belongs to the active system or standby system. In this embodiment of the invention, the column 510 is used when a physical server in the standby system is substituted for any of physical servers in the active system when it fails.

FIG. 6 shows in detail the server virtualization module management table 107. The server virtualization module management table stores detailed information on the server virtualization module. A column 601 stores a virtualization module identifier for identifying a plurality of server virtualization modules managed by the management server 101. A column 602 stores a network address which serves as access information for controlling a server virtualization module from the outside. A column 603 stores the location of an OS image which is used to activate a virtual server. A column 604 stores a state indicative of whether or not the virtual server is currently active. A column 605 stores the amount of processors and a memory capacity allocated to the virtual server. A column 606 stores an NIC identifier of the virtual server, and assignment information for a virtual network corresponding thereto. A column 607 stores a VLAN setting of a network of virtual servers. A column 608 stores the location of an image file assigned to the virtual server for storing data. A column 609 stores a location at which a snapshot of virtual servers is stored when it is captured. The virtualization module identifier in the column 601 is corresponded to the virtualization module identifier in the column 509 of the aforementioned server management table. With this correspondence, when a particular physical server fails, the server management table can be searched to determine whether or not any server virtualization module has been active on the failed server, and the server virtualization module management table, pointed to that table through the virtualization module identifier, can be searched to acquire information relating to virtual servers, if any, which have been active on the physical server.

Figure 7:
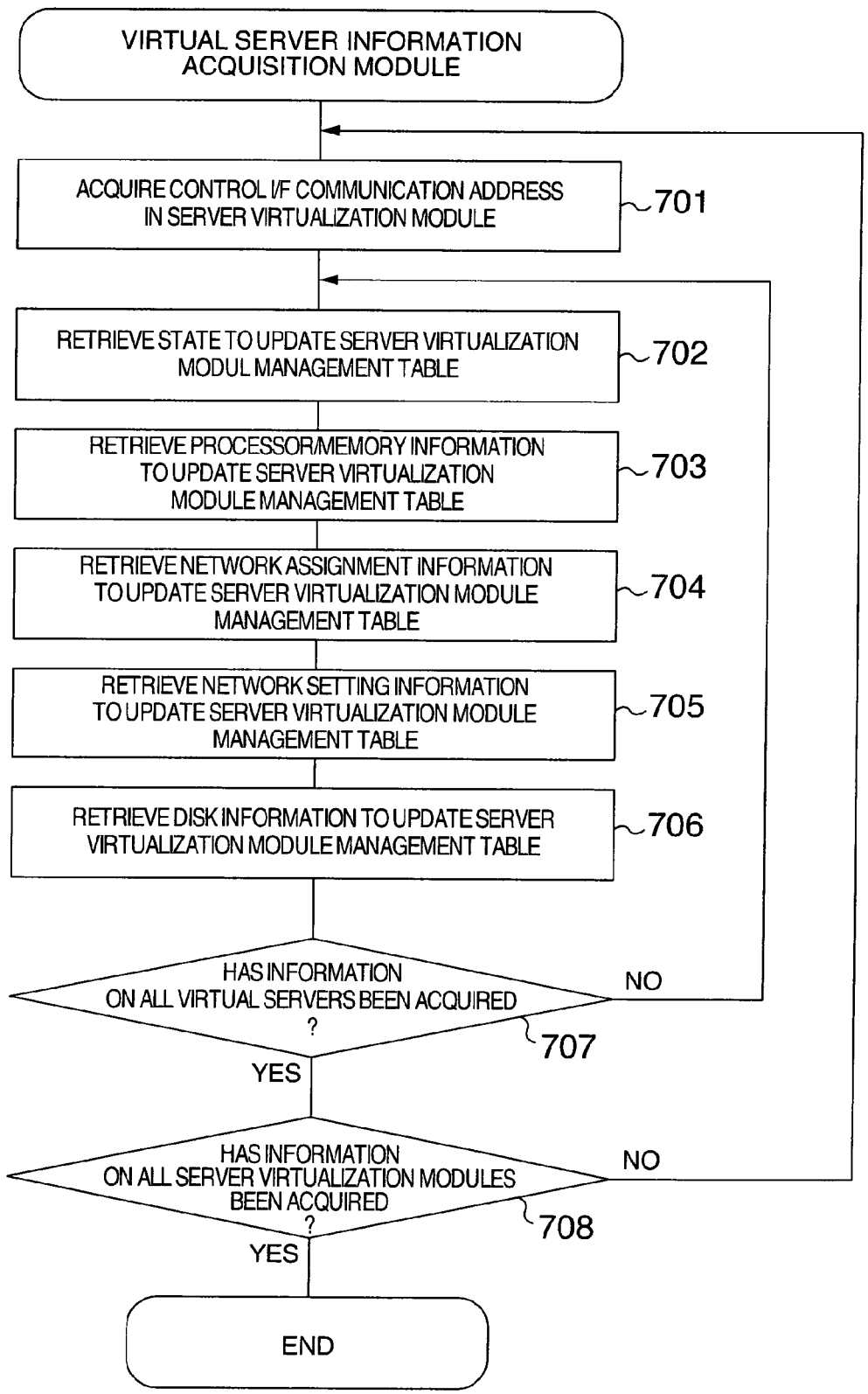
FIG. 7 is a flow chart illustrating a process performed by a virtual server information acquisition module.

FIG. 7 is a flow chart illustrating a process performed by the virtual server information acquisition module 105. The virtual server information acquisition module 105 executes the process for acquiring information relating to virtual servers from the server virtualization module 206, and storing the information in the sever virtualization module management table 107. This process is executed on a periodic basis to acquire at all times the latest information relating to virtual servers, which is reflected to the server virtualization module management table 107. Also, this process collects information relating to all virtual servers of all server virtualization modules managed by the management server 101. At step 701, the virtual server information acquisition module 105 acquires the communication address of the control I/F 222 in the server virtualization module 107. At step 702, the module 105 retrieves and stores the state in the column 605 of the server virtualization module management table 107. At step 703, the module 105 retrieves and stores information relating to processor/memory in the column 605 of the server virtualization module management table 107. At step 704, the module 105 retrieves and stores a network assignment in the column 606 of the server virtualization module management table 107. At step 705, the module retrieves and stores information relating to a network setting in the column 607 of the server virtualization module management table 107. At step 706, the module 105 retrieves and stores a VLAN setting in the column 608 of the server virtualization module management table 107. At step 707, the module 105 determines whether or not it has retrieved all information relating to all active virtual servers on the server virtualization module. At step 708, the module 105 determines whether or not it has retrieved all information relating to all server virtualization modules managed by the management server 101. By acquiring the foregoing information on a periodic basis, the module 105 can maintain the latest information on currently active virtual servers and the like. Also, the virtual server information acquisition module 105 executes the process of FIG. 7 on a periodic basis, however, in another method contemplated herein, a function may be provided for issuing an event when any information is changed, such that the virtual server information acquisition module executes the process upon receipt of the event.

Figure 8:
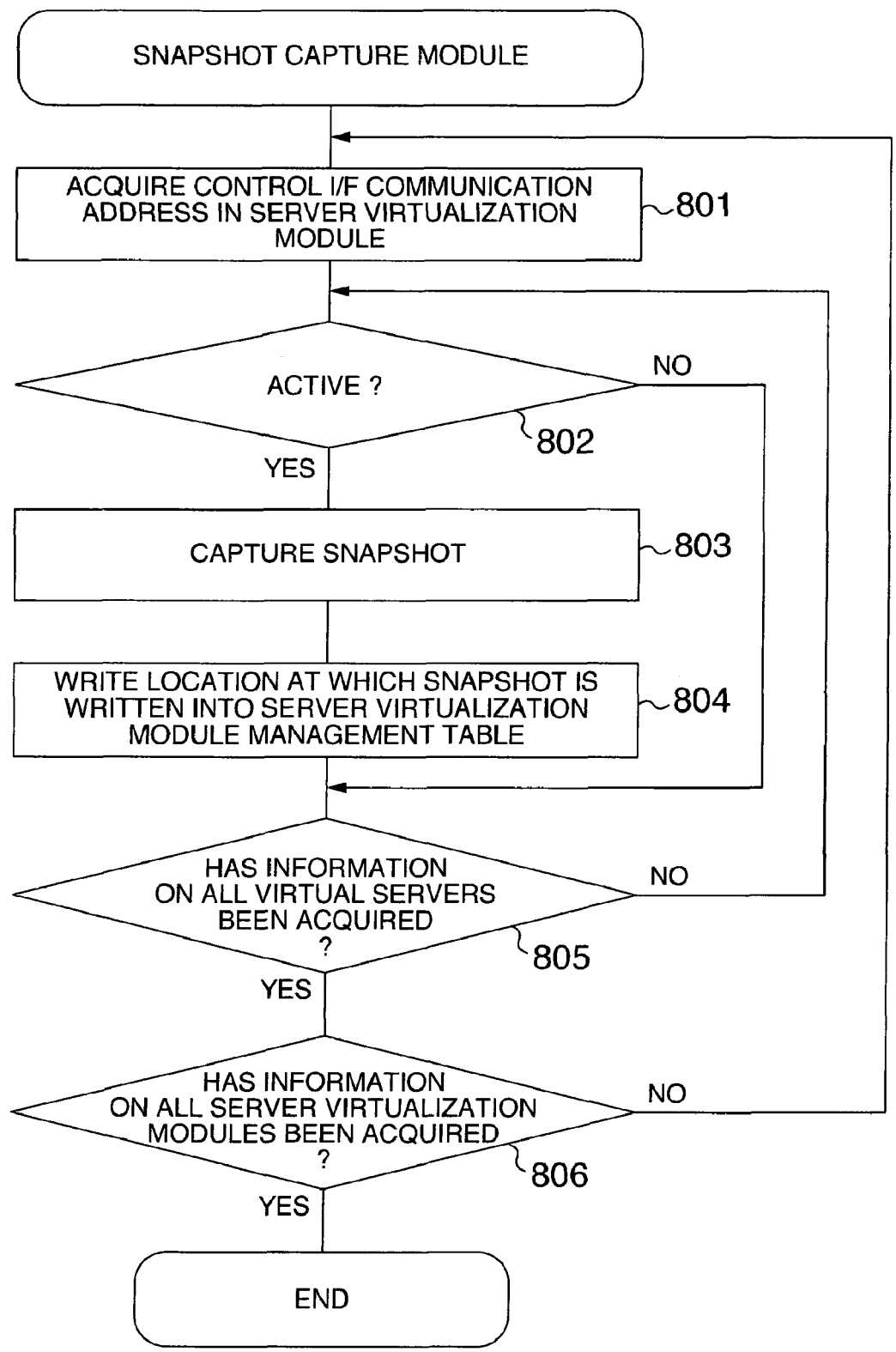
FIG. 8 is a flow chart illustrating a process performed by a snapshot capture module.

FIG. 8 is a flow chart illustrating a process performed by the snapshot capture module 104. The snapshot capture module 104 captures a snapshot of active virtual servers on a periodic basis. At step 801, the snapshot capture module 104 acquires the communication address of the control I/F 222 in the server virtualization module 206. At step 802, the module 104 searches the server virtualization module management table 107 to determine whether or not any virtual server is active, and goes to step 803 if any virtual server is active. At step 803, the module 104 captures a snapshot of the virtual server using the control I/F 222 of the server virtualization module 206. The captured snapshot is stored in the virtual server boot image disk 313 within the disk array device 310. At step 804, the module 104 stores the location at which the snapshot is stored in the server virtualization module management table 107. At step 805, the module 104 determines whether or not it has executed the process for all active virtual servers on the server virtualization module. At step 806, the module 104 determines whether or not it has executed the process for all server virtualization modules managed by the management server 101. With the foregoing process, the snapshot capture module 104 can capture a snapshot of active virtual servers on a periodic basis, so that virtual servers can be activated from the latest snapshot when a failed physical server is replaced by another physical server.

Figure 9:
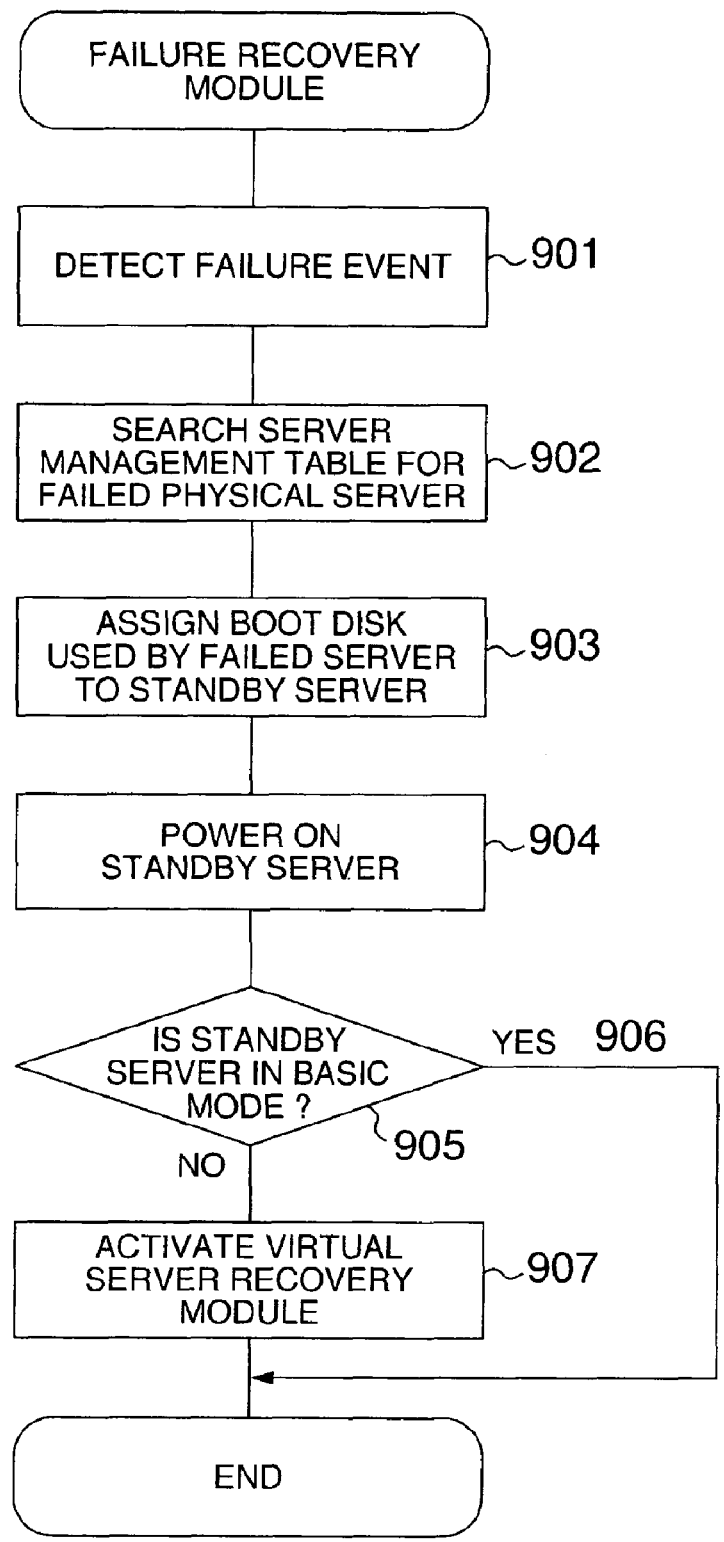
FIG. 9 is a flow chart illustrating a process performed by a failure recovery module.

FIG. 9 is a flow chart illustrating a process performed by the failure recovery module 102. While the aforementioned virtual server information acquisition module 105 and snapshot capture module 104 operate when the active server is normally operating, the failure recovery module 102 is activated when a physical server fails, and conducts control for taking over to a standby server. At step 901, the failure recovery module 102 detects a failure event. The failure event is transferred from the BMC 260 in FIG. 3 through the network 109. The failure event contains, for example, the identifier of the failed physical server, the location of the failure, and the like. At step 902, the module 102 searches the server management table 103 based on the physical server identifier of the failed physical server to identify a table entry of the failed physical server. At step 903, the module 102 assigns an OS boot disk used by the failed physical server to a physical server in the standby system. This assignment will be described later in greater details with reference to FIGS. 10 and 11. At step 904, the module 102 powers on the physical server in the standby system. This causes the physical server in the standby system to activate the OS and applications which have been running on the failed physical server. In this event, when a server virtualization module has been active on the failed physical server, the server virtualization module is automatically activated on the physical server in the standby system. At step 906, the module 102 determines whether or not the physical server in the standby system is in a basic mode. This determination can be made by searching the server management table 103. The basic mode refers to a physical server on which no server virtualization module is active. When the server virtualization module has been active on the failed physical server, the module 102 executes step 907. At step 907, the module 102 activates the virtual server recovery module 106. A process executed by the virtual server recovery module 106 will be described later with reference to a detailed flow chart.

Figure 10:
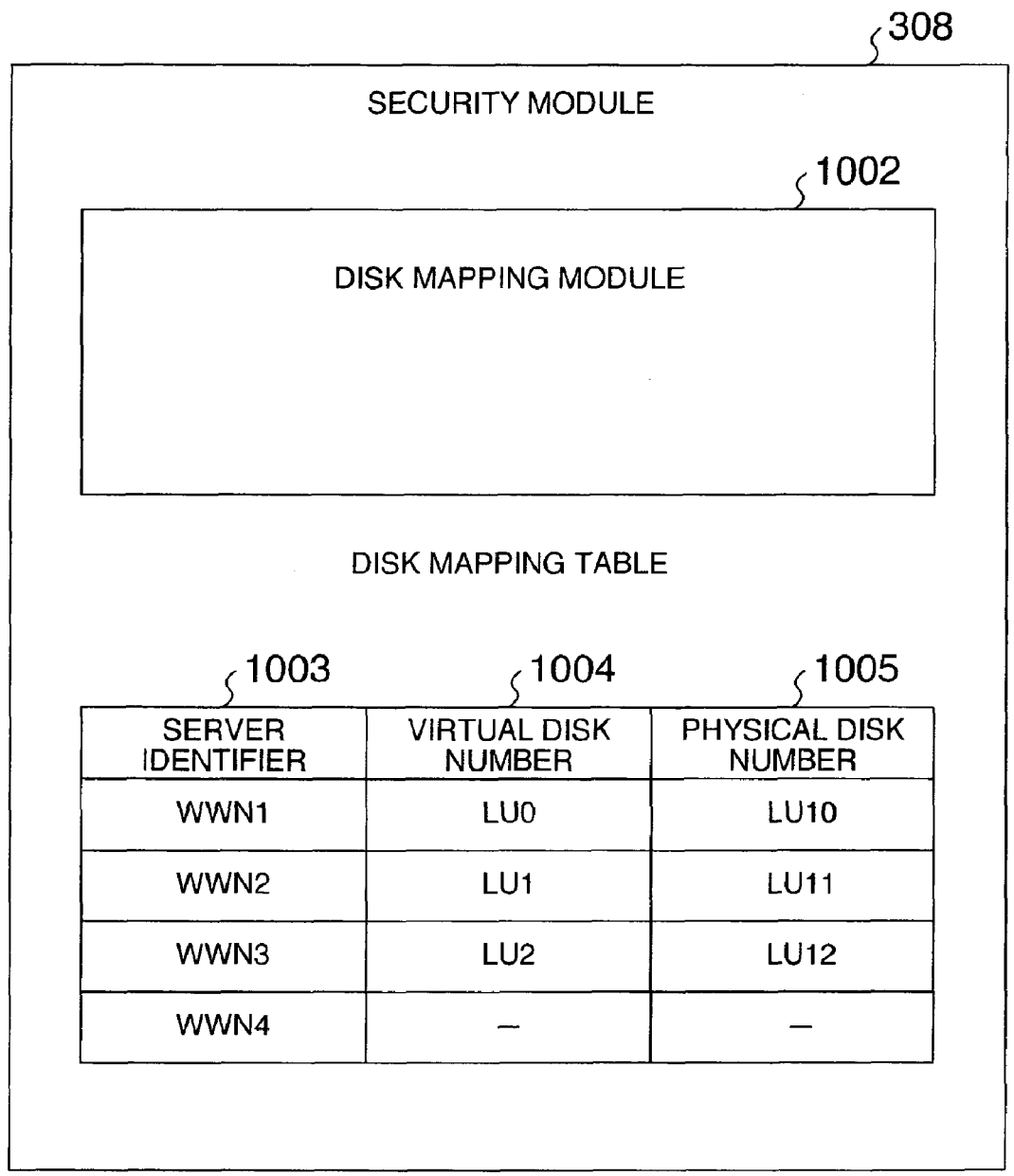
FIG. 10 is a block diagram illustrating the configuration of a security module.
Figure 11:
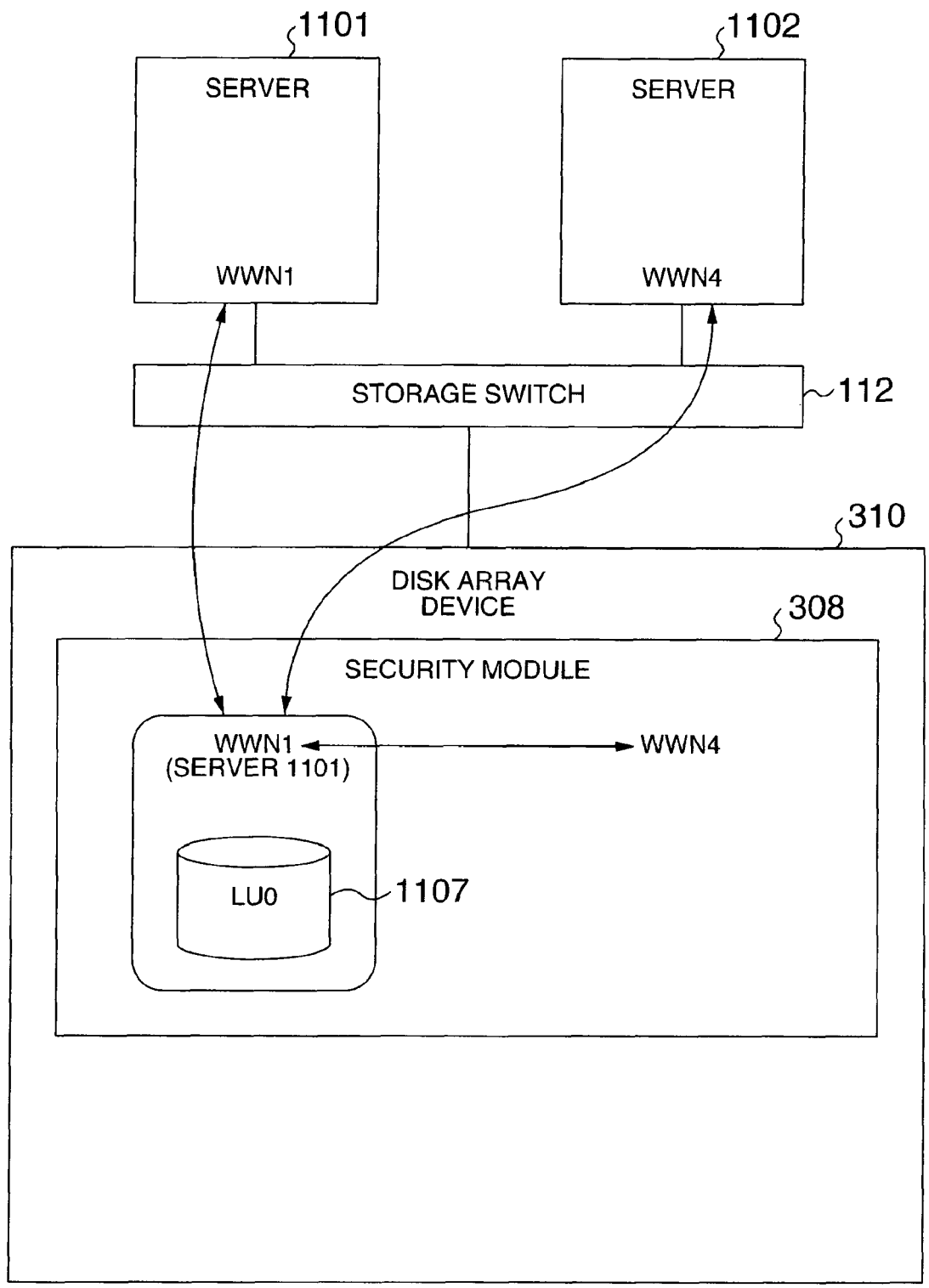
FIG. 11 is a block diagram illustrating an exemplary setting of the security module.

FIGS. 10 and 11 describe a method of taking over the OS boot disk at step 903 executed by the failure recovery module 102. A disk mapping module 1002 in the security module 308 of the disk array device 310 controls mapping of physical servers to disks in the disk array device 310. Specifically, the disk mapping module 102 allows only a specified physical server to reference and/or update a particular disk within the disk array device 310. Specifically, a security function 1001 has a disk mapping table, the contents of which are controlled to control a disk assigned to a physical server. A column 1003 of the disk mapping table stores a server identifier. The server identifier corresponds to the server identifier stored in the column 503 of the server management table 103, and is unique to every physical server. A column 1004 of the disk mapping table indicates a virtual disk number. The virtual disk number indicates a disk number associated with a physical server. A column 1005 of the disk mapping table indicates a physical disk number. The physical disk number is a unique disk number within the disk array device 310. For some physical servers, a particular disk number can have a special meaning such as dedicated to a boot disk, so that the flexibility in management can be increased if the virtual disk number can be exchanged with the physical disk number. FIG. 11 illustrates how a disk is taken over. Assuming that a server 1101 has a server identifier WWN1 and a server 1102 has WWN4, the security module 308 of the disk array device 310 can rewrite all WWN1 to WWN4, thereby switching LU0 (1107) from the server 1101 to the server 1102. This switching can be performed for the OS boot disk to control OS booting.

Figure 12:
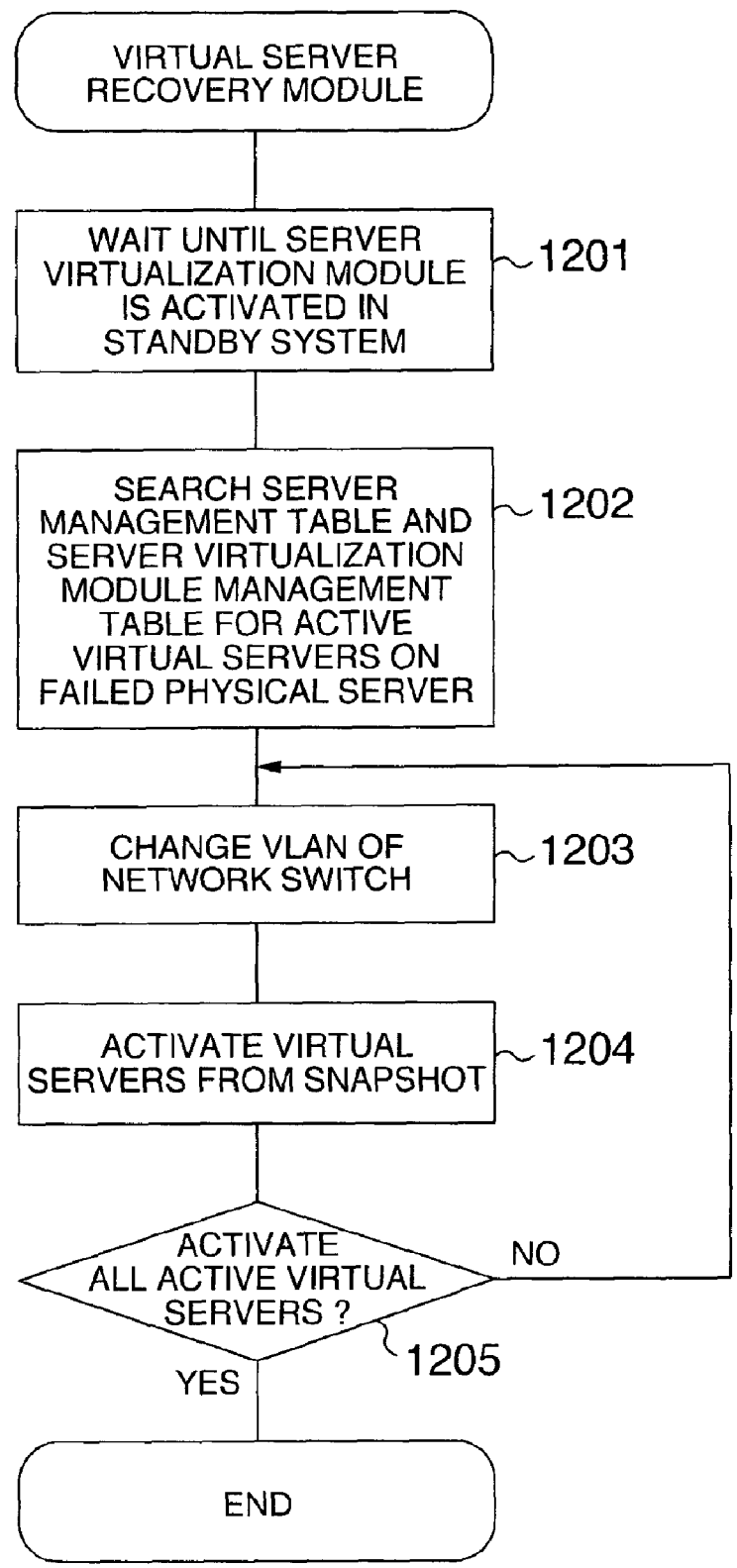
FIG. 12 is a flow chart illustrating a process performed by a virtual server recovery module.

FIG. 12 is a flow chart illustrating a process performed by the virtual server recovery module 106. When a physical server fails, the virtual server recovery module 106 recovers virtual servers which have been active on the physical server such that the virtual servers can operate on another physical server. At step 1201, the virtual server recovery module 106 waits until a server virtualization module activates in the standby system. The module 106 can determine whether or not a server virtualization module has activated by issuing some command to the control I/F communication address of the server virtualization module management table 107 to see whether or not a correct response is returned. At step 1202, the module 106 finds virtual servers which have been active on the failed physical server. In this event, the module 106 can determine whether or not a server virtualization module has been active on the failed physical server by searching the server management table 103, and retrieve information relating to virtual servers which have been active on the failed physical server by searching the server virtualization module management table 107 pointed to the server management table 103. At step 1203, the module 106 changes the VLAN of the network switch 108. This processing means an association of the virtual servers with the network switch 108. When the VLAN has been set on the failed physical server, a replaced server in the standby system is controlled to also belong to the same VLAN environment, thereby enabling automatic settings of not only the virtual server environment but also a peripheral environment such as a network of virtual servers. It should be noted that information relating to the VLAN setting of virtual servers is described in the column 607 of the server virtualization module management table 107. Also, the correspondence of virtual servers to the physical servers for this VLAN can be known from the network assignment in the column 606. Further, since the port of the network switch 108 can also be known by searching the server management table 103, the VLAN setting can be automatically changed. At step 1204, the module 106 activates virtual servers from a snapshot. This step is controlled using the "Capture Snapshot" of the control I/F described in connection with FIG. 4. Also, in regard to the snapshot, the column 609 of the server virtualization module management table 107 describes the location at which a snapshot of an active virtual server is stored in correspondence to this virtual server, so that a virtual server to be activated and a snapshot corresponding thereto can be known by referencing the column 609. These steps 1203, 1204 are repeated until the module 106 confirms at step 1205 that all virtual servers, which had been active upon occurrence of the failure, have been recovered on the physical server in the standby system. In this way, the module 106 can automatically and correctly activate the virtual servers which have been active on the failed physical server. The failure recovery module 106 can automatically determine whether or not the server virtualization module has been active on the failed server, and automate the processing for recovering virtual servers when the server virtualization module has been active. Also, since the standby system need not previously prepare the server virtualization module, the software license can be saved for the standby system.

2. Second Embodiment

Figure 13:
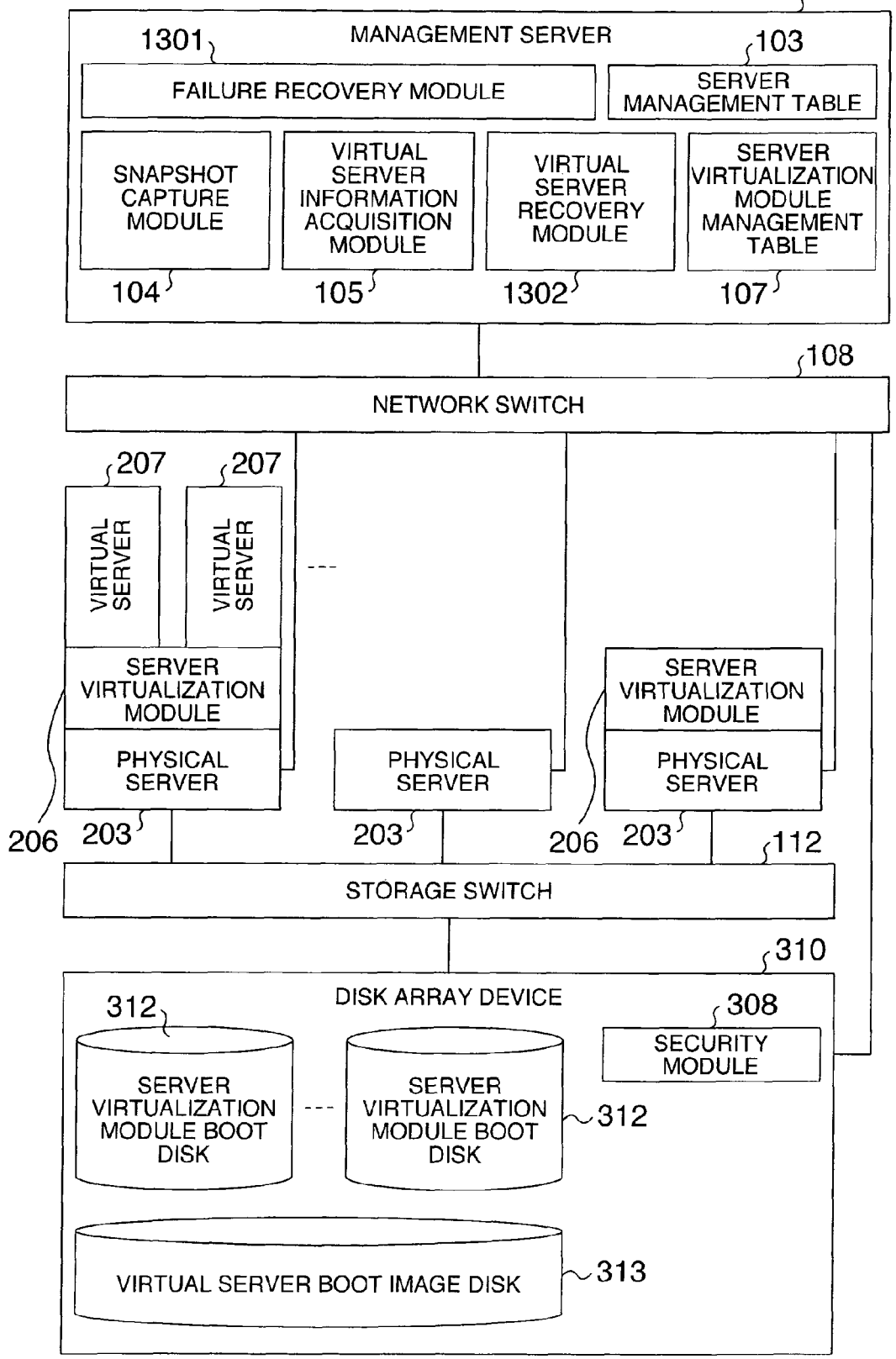
FIG. 13 is a block diagram generally illustrating the configuration of a second embodiment of the present invention.

FIG. 13 generally illustrates a virtual server environment which embodies a failure recovery method according to a second embodiment in the present invention. The second embodiment mainly differs from the first embodiment in that the former comprises a failure recovery module 1301 and a virtual server recovery module 1302 in a management server 151. In the first embodiment, a failed one of the active physical servers 203 is replaced by a physical server in the standby system. In the second embodiment, even if failures have occurred in a plurality of physical servers with server virtualization modules being active on the respective ones, the physical servers can be recovered by a single physical server in a standby system.

Figure 14:
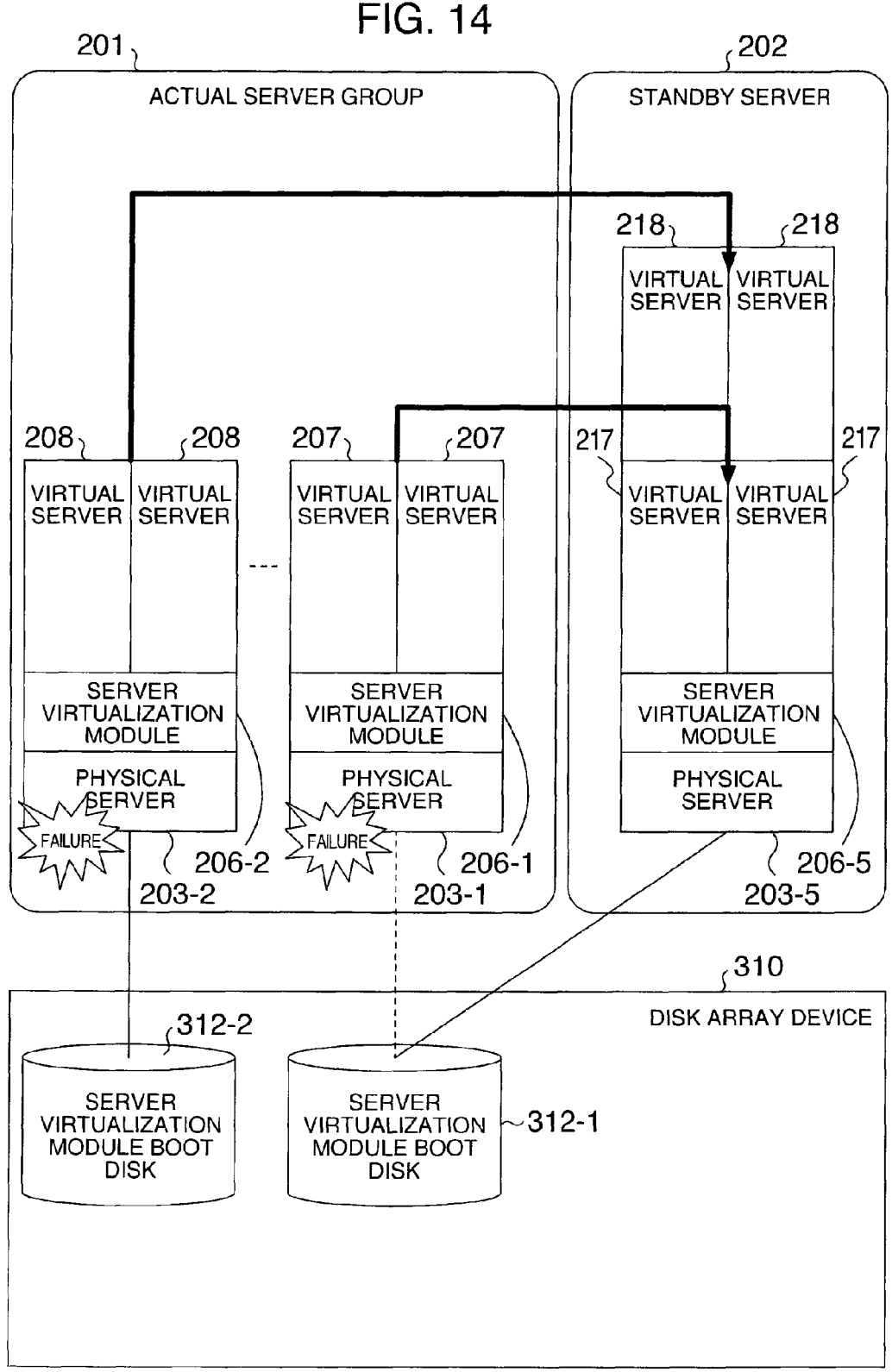
FIG. 14 is a block diagram generally illustrating the operation of the second embodiment.

FIG. 14 generally illustrates operations involved in the failure recovery method according to the second embodiment. Server virtualization modules 206-1, 206-2 are active respectively on a plurality of servers 203-1, 203-2 which make up an active server group 201. Assuming that both the physical servers 203-1, 203-2 fail one after the other, all virtual servers 207, 208, which have being active on the plurality of failed physical servers 203-1, 203-2 are activated by a server virtualization module 206-5 of a physical server 203-5 in a standby system 202 as indicated by 217, 218. In this event, a server virtualization boot disk 312-1 of the physical server 203-1 which first failed is assigned to the physical server 203-5 in the standby system. If a physical server fails at a later time, a virtual server is activated by the server virtualization module 206-5 which has already been active on the physical server 203-5. This control permits a single physical server to support a plurality of failures.

Figure 15:
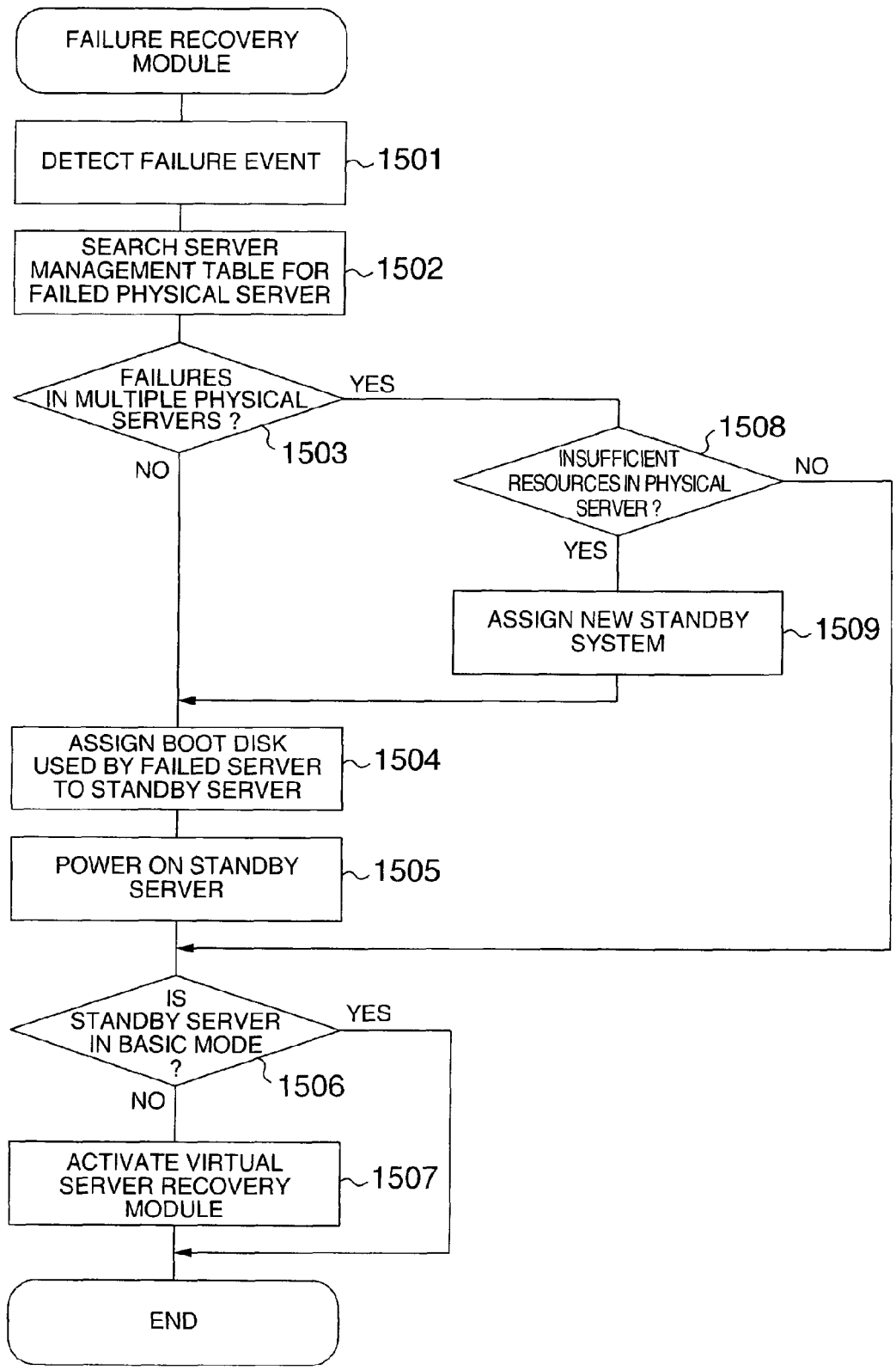
FIG. 15 is a flow chart illustrating a process performed by a failure recovery module in the second embodiment.

FIG. 15 is a flow chart illustrating a process performed by the failure recovery module 1301. A failure event detection at step 1501, and a search for a failed physical server at step 1502 are completely the same as steps 501 and 502, respectively, of the first embodiment described in connection with FIG. 5. At next step 1503, the failure recovery module 1301 detects failures in multiple physical servers. This detection can be made, for example, by adding a failure state to the state of the server management table, and detecting whether or not a failure has already occurred. In the event of multiple failures, the module 1301 executes step 1508. At step 1508, the module 1301 determines whether or not the resources such as the processor, memory and the like of the physical server are insufficient in the standby system. This determination is made when multiple virtual servers are generated in order to avoid low processing performance, or a failure in generating the virtual servers due to insufficient resources. When the resources are not enough, module 1301 assigns a new standby system at step 1509, and goes to step 1504. Otherwise, the module 1301 goes to step 1506. At step 1504, the module 1301 assigns an OS boot disk used by the failed physical server to a physical server in the new standby system. At step 1505, the module 1301 powers on the physical server in the standby system. In this way, the OS and applications on the failed physical server are activated on the physical server in the standby system. In this event, when the server virtualization module has been active on the failed physical server, the server virtualization module is automatically activated on the physical server in the standby system. At step 1506, the module 1301 determines whether or not the physical server in the standby system is in the basic mode. This determination can be made by searching the server management table 103. The basic mode refers to a physical server on which no server virtualization module is active. When the server virtualization module has been active on the failed physical server, the module 1301 executes step 1507. At step 1507, the module 1301 activates the virtual server recovery module 1302. A process executed by the virtual server recovery module 1302 will be described later with reference to a detailed flow chart. With the foregoing processing flow, even if a plurality of physical servers fail one after another, the recovery from the failures can be accomplished by a single physical server as long as the physical server, which has been activated for the recovery, is not short of resources.

Figure 16:
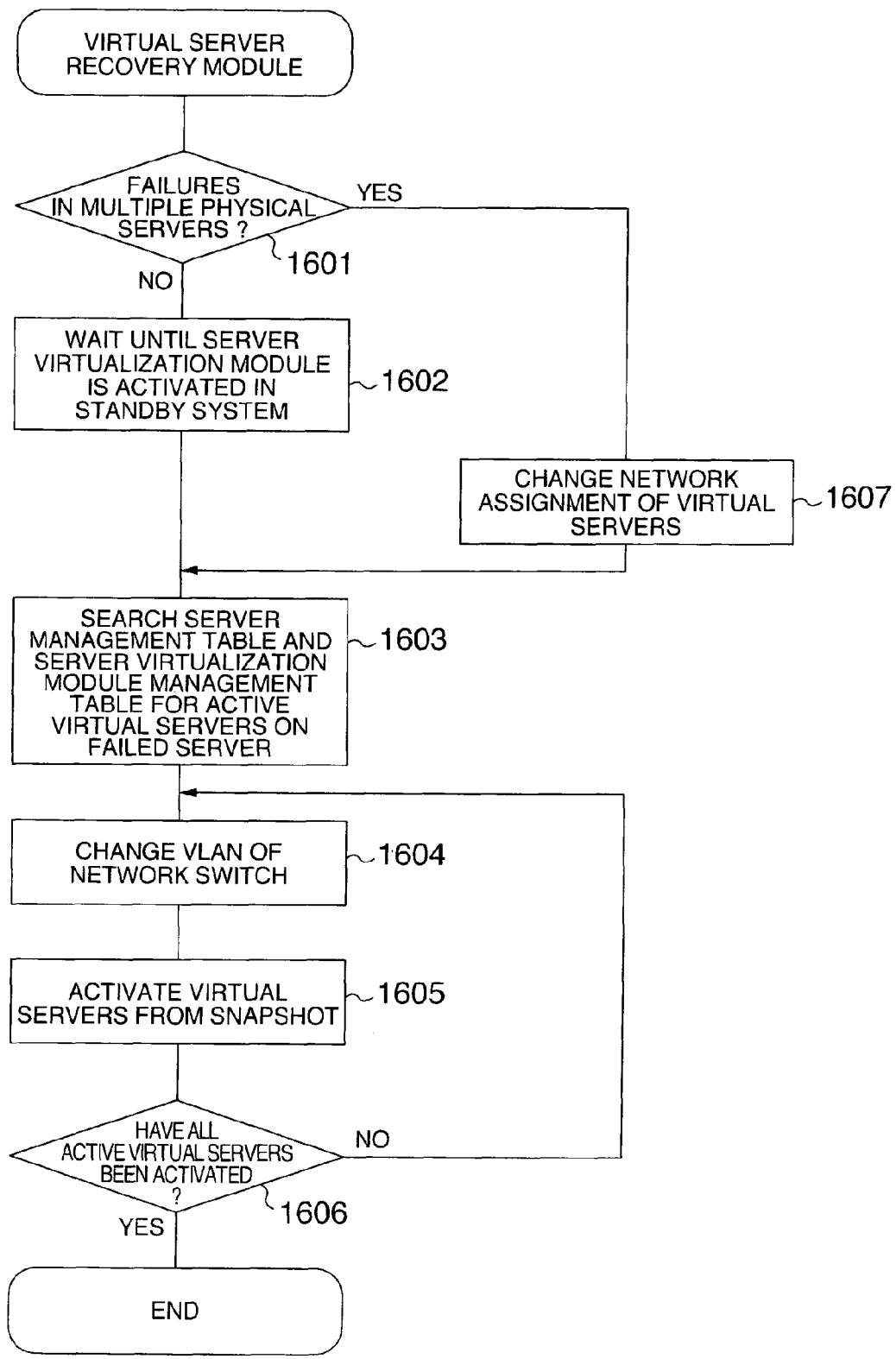
FIG. 16 is a flow chart illustrating a process performed by a virtual server recovery module in the second embodiment.

FIG. 16 is a flow chart illustrating a process performed by the virtual server recovery module 1302. The virtual server recovery module 1302 executes a process, when a physical server fails, for recovering virtual servers which have been active on the failed physical server. At step 1601, the module 1302 determines whether or not multiple physical servers have failed. The failed physical modules are detected by the same method as that used at step 1503. Upon determination of multiple failures, the module 1302 goes to step 1607, where the module 1302 changes a network assignment of virtual servers. This is the processing for ensuring the network security for active virtual servers on a plurality of server virtualization modules. When a plurality of server virtualization modules are used, active virtual servers residing thereon can be executing different jobs. In such a situation, they may have been previously set to different VLAN's in the actual system environment. For integrating a plurality of different environments into a single server virtualization module, the virtual servers must be classified into different VLAN's in the server virtualization module. At step 1607, the module 1302 performs the processing for automating settings to create the same network environment as the actual system. At step 1602, the module 1302 waits until the server virtualization module activates in the standby system. The module 1302 can determine whether or not the server virtualization module has activated by issuing some command to the control I/F communication address of the server virtualization module management table 107 to see whether or not a correct response is returned. At step 1603, the module 1302 finds virtual servers which have been active on the failed physical servers. In this event, the module 1302 can determine whether or not a server virtualization module has been active on a failed physical server by searching the server management table 103, and retrieve information relating to virtual servers which have been active on the failed physical server by searching the server virtualization module management table 107 pointed to the server management table 103. At step 1604, the module 1302 changes the VLAN of the network switch 108, such that the physical server in the standby system belongs to the same VLAN environment as the failed physical server. Next, at step 1605, the module 1302 activates virtual servers from a snapshot. These steps are completely the same as the steps 1204-1205 in the operational flow of the virtual server recovery module 106 in the first embodiment described in connection with FIG. 12. The second embodiment is also similar to the first embodiment in that steps 1604-1605 are repeated until the module 1302 confirms at step 1605 that all virtual servers, which had been active upon occurrence of the failure, have been recovered on the physical server in the standby system. In this way, the module 1302 can automatically and correctly activate the virtual servers which have been active on the failed physical servers. In addition, since multiple failed physical servers can be recovered only by a single physical server, the availability is improved. Also, since the standby system need not previously prepare the server virtualization module, the software license can be saved for the standby system.

3. Third Embodiment

A third embodiment of the present invention provides a system which can recover a failed physical server that has a server virtualization module as well as a failed physical server that does not have a server virtualization module by a single physical server in a standby system, irrespective of which physical server fails earlier.

Figure 17:
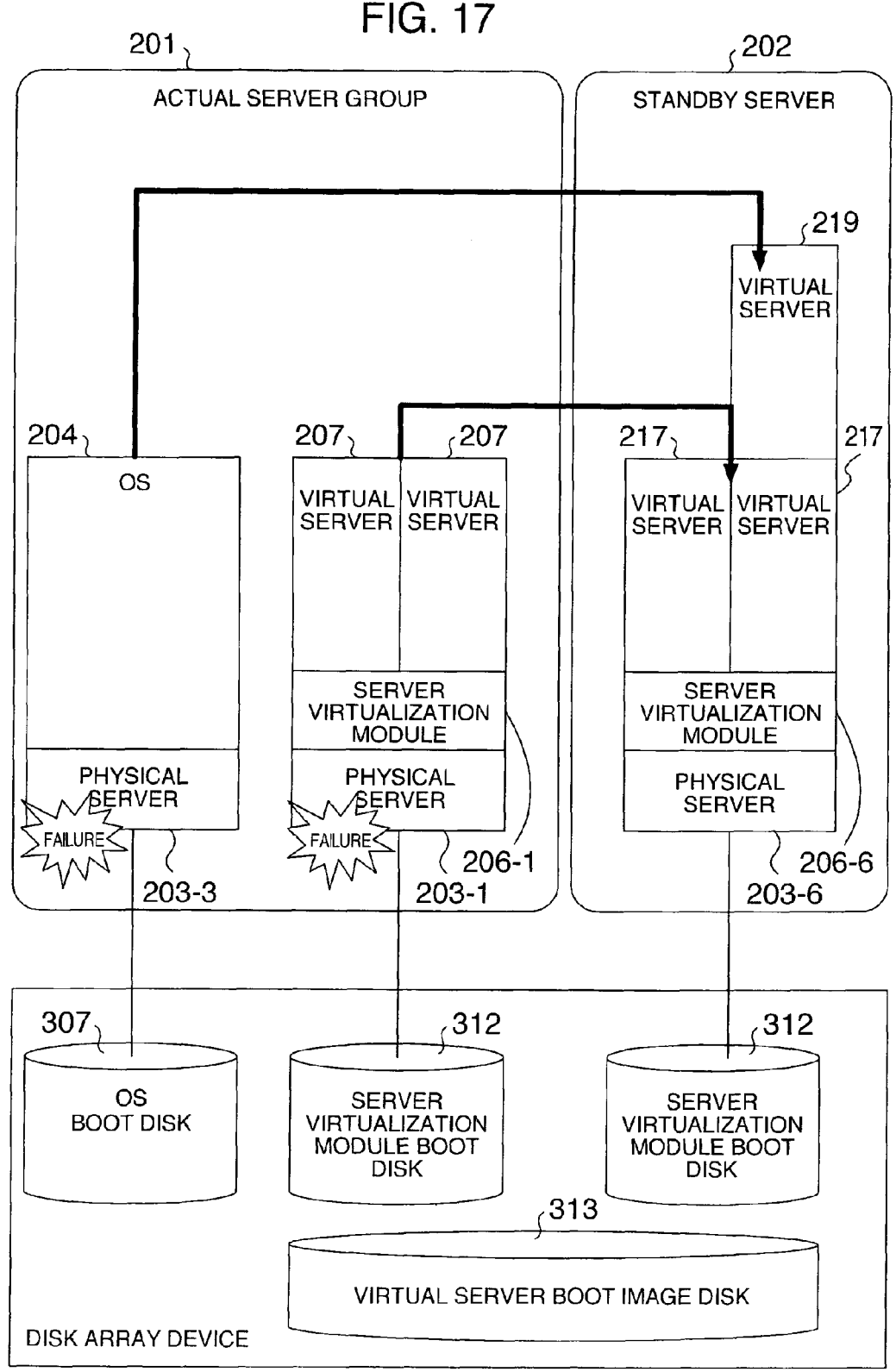
FIG. 17 is a block diagram generally illustrating the operation of a third embodiment.

The general system configuration of the third embodiment is similar to the configuration of the system in the first embodiment illustrated in FIG. 1. Also, the physical server 203 of the third embodiment is not either different from that illustrated in FIG. 3. FIG. 17 is a block diagram generally illustrating operations performed in the configuration of the third embodiment.

A server virtualization module 206-6 has been previously provided for a physical server 203-6 in a standby system 202. A server virtualization module boot disk 312-6 is used to previously activate the server virtualization module 206-6. An OS 204 which has been running on the physical server 203-3 when the physical server 203-3 failed is activated as a virtual server 219 in the standby system. Also, when a failure occurs on a physical server 203-1 which has a server virtualization module 206-1, a virtual server 217 is activated for recovering a virtual server 207 which has been active on the physical server 203-1 using a virtual server OS image on a virtual server boot image disk 313. In this way, multiple failed physical servers can be replaced by a single physical server in the standby system irrespective of whether the server virtualization module is active on any physical servers.

Figure 18:
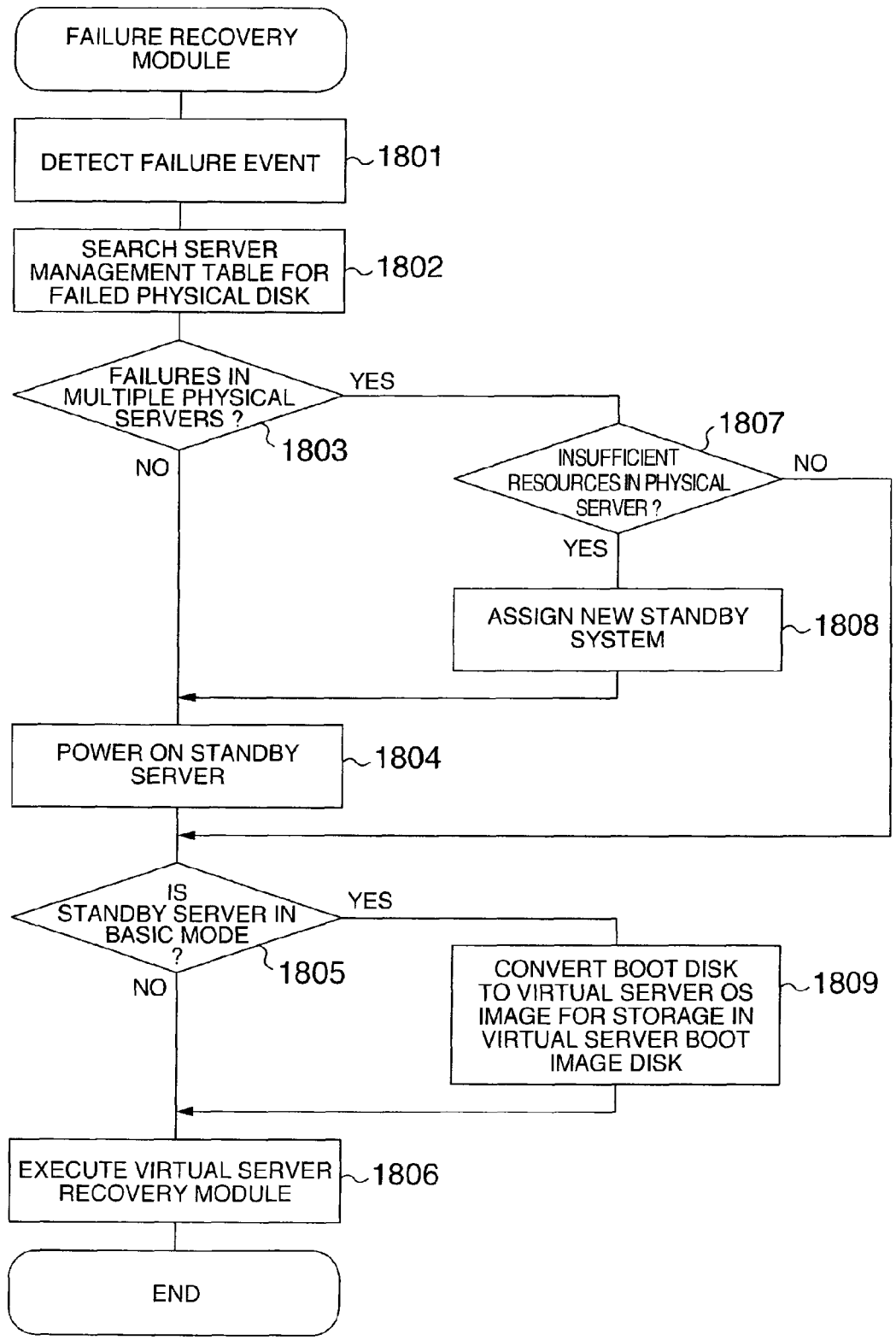
FIG. 18 is a flow chart illustrating a process performed by a failure recovery module in the third embodiment.

FIG. 18 is a flow chart illustrating a process performed by the failure recovery module of the third embodiment. At step 1801, the failure recovery module detects a failure event. The failure event is transferred from the BMC 260 (see FIG. 3) through a network. The failure event contains, for example, the identifier of the failed physical server, the location of the failure, and the like. At step 1802, the module searches the server management table based on the physical server identifier of the failed physical server to identify a table entry of the failed physical server. At step 1803, the module detects multiple failed physical servers. This detection can be made, for example, by adding a failure state to the state of the server management table, and detecting whether or not a failure has already occurred. In the event of multiple failures, the module executes step 1807. At step 1807, the module determines whether or not the resources such as the processor, memory and the like of the physical server are insufficient. This determination is made when multiple virtual servers are generated in order to avoid low processing performance, or a failure in generating the virtual servers due to insufficient resources. When the resources are not enough, the module assigns a new standby system at step 1808, and goes to step 1804. Otherwise, the module goes to step 1805. At step 1804, the module powers on the physical server 203-6 in the standby system. This causes a server virtualization module 206-6 to activate in the standby system. At step 1805, the module determines whether or not the physical server in the standby system is in the basic mode. This determination can be made by searching the server management table. The basic mode refers to a physical server on which no server virtualization module is active. When the physical server fails while it is operating in the basic mode, the module converts the boot disk to a virtual server OS image, for storage in the virtual server boot image disk 313 at step 1809. This conversion is basically made on a disk which stores the OS to reformat the disk, such that it can be read by the virtual server. In some cases, the module also replaces a driver for the OS which depends on hardware, and the like. Next, the module goes to step 1806. When a server virtualization module has been active on the failed physical server, the module goes directly to step 1806 without passing the above-mentioned step 1809. At step 1806, the failure recovery module activates a virtual server on the physical server 203-6 in the standby system by the action of the virtual server recovery module 106 in a manner similar to the first embodiment. Details on the virtual server recovery module 106 are just like those previously described in connection with FIG. 12.

FIG. 19 shows a server virtualization module management table in the third embodiment. The server virtualization module management table of the third embodiment has completely the same columns as the server virtualization module management table 106 of the first embodiment shown in FIG. 6. Specifically, a column 601 stores a virtual module identifier for identifying a server virtualization module; a column 602 a network address of the control I/F; a column 603 the location at which a virtual server OS image is stored; a column 604 a state indicative of whether or not a virtual server is currently active; a column 605 the amount of processors and memory capacity assigned to the virtual server. A column 606 stores an NIC identifier of a virtual server, and information on assignment with an NIC contained in a physical server corresponding thereto, and a column 607 stores information relating on a VLAN setting of a network of virtual servers. A column 608 stores the location of an image file assigned to a virtual server for storing data. A column 609 stores a location at which a snapshot of virtual servers is stored. In the third embodiment, the server virtualization module 206-6 has been previously made active in the standby system. For this purpose, the server virtualization module management table 107 previously stores detailed information on the "server virtualization module 3" which corresponds to the server virtualization module 206-6.

With the foregoing configuration, in the third embodiment, even multiple failed physical servers can be replaced by a single physical server irrespective of whether or not the server virtualization module is active on the failed physical servers.

The present invention can also be used to port a system to another physical server.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A failure recovery method in a server system which includes a plurality of servers, each of which has a machine virtualization module for building a plurality of virtual machines thereon, said method comprising the steps of:

acquiring virtual machine information having a correspondence between each server and an active virtual machine on the machine virtualization module of said each server to manage the virtual machine information; and when one of said plurality of servers fails, booting a boot disk which stores said machine virtualization module and is connected to said failed server, to a server in a standby system, and recovering a virtual machine which has been active on the failed server based on the virtual machine information on the machine virtualization module booted on the server in the standby system, wherein the standby server is independent of any of the plurality of servers so that if any one of the plurality of servers fails, the standby server can be selected without regard to which server failed, wherein said server system includes a management server connected to said plurality of servers and said server in the standby system, and said server system includes a storage device connected to said plurality of servers and said server in the standby system, wherein said virtual machine information is stored and managed in said management server, and wherein said boot disk is stored in said storage device.

2. A failure recovery method according to claim 1, further comprising the steps of:

capturing and saving a snapshot including a memory image of each active virtual machine;

recording a location at which the snapshot is saved as part of the virtual machine information; and activating the virtual machine which has been active on the failed server by activating said virtual machine from the snapshot.

3. A failure recovery method according to claim 1, further comprising the steps of:

when a server fails, referencing information on said machine virtualization module indicative of whether or not a machine virtualization module is active for each of the servers; and recovering a virtual machine when determining that said virtual machine has been active on said failed server.

4. A failure recovery method according to claim 1, wherein when another server fails after a virtual machine has been recovered on a server in the standby system, a virtual machine is generated in an active machine virtualization module on said server in the standby system to recover said virtual machine.

5. A failure recovery method according to claim 4, wherein when a new virtual machine cannot be generated, a server in another standby system is assigned to recover a virtual machine.

6. A failure recovery method according to claim 1, further comprising the step of:

recovering a virtual network set for a network of said virtual machine when said virtual machine is recovered.

7. The failure recovery method according to claim 1, wherein the acquiring, booting and recovering steps are performed under control of said management server.

8. The failure recovery method according to claim 1, wherein the virtual machine information acquiring step is executed on a periodic basis.

9. The failure recovery method according to claim 8, wherein said virtual machine information also includes a correspondence between each server and a stopped virtual machine on the machine virtualization module of said each server.

10. The failure recovery method according to claim 1, wherein the virtual machine information acquiring step is executed on an event issued when any information in the virtual machine information is changed.

11. The failure recovery method according to claim 10, wherein said virtual machine information also includes a correspondence between each server and a stopped virtual machine on the machine virtualization module of said each server.

* * * * *